United States Patent
Nose et al.

(10) Patent No.: US 10,900,429 B2
(45) Date of Patent: Jan. 26, 2021

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Yuki Nose, Kasugai (JP); Yuto Ikeda, Toyota (JP); Keiichi Myojo, Okazaki (JP); Hirokazu Ando, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/519,401

(22) Filed: Jul. 23, 2019

(65) Prior Publication Data

US 2020/0049086 A1 Feb. 13, 2020

(30) Foreign Application Priority Data

Aug. 7, 2018 (JP) ................ 2018-148060

(51) Int. Cl.
| | |
|---|---|
| *F02D 41/02* | (2006.01) |
| *F01N 3/035* | (2006.01) |
| *F01N 11/00* | (2006.01) |
| *F02D 41/38* | (2006.01) |
| *F01N 3/025* | (2006.01) |
| *F01N 3/10* | (2006.01) |

(52) U.S. Cl.
CPC ........... *F02D 41/029* (2013.01); *F01N 3/025* (2013.01); *F01N 3/035* (2013.01); *F01N 3/101* (2013.01); *F01N 11/00* (2013.01); *F02D 41/025* (2013.01); *F02D 41/38* (2013.01); *F01N 2550/04* (2013.01); *F02D 2041/389* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,148,612 | A * | 11/2000 | Yamashita | ............ F01N 3/0842 60/277 |
| 6,854,264 | B2 * | 2/2005 | Elwart | ................ F01N 13/0093 60/285 |
| 8,671,665 | B2 * | 3/2014 | Yasui | ...................... F01N 3/208 60/286 |
| 9,719,451 | B2 * | 8/2017 | Hokuto | ................. F02D 41/008 |
| 10,167,791 | B2 | 1/2019 | Yamaguchi et al. | |

(Continued)

*Primary Examiner* — Binh Q Tran
(74) *Attorney, Agent, or Firm* — Oliff PLC

(57) ABSTRACT

A controller is configured to control an internal combustion engine. The controller is configured to execute a catalyst temperature-increasing control of increasing a temperature of the three-way catalyst device by introducing air-fuel mixture, which contains the fuel injected by a fuel injection valve, into an exhaust passage without burning the air-fuel mixture in a cylinder. The controller includes an air-fuel ratio control unit configured to control an air-fuel ratio of the air-fuel mixture during the execution of the catalyst temperature-increasing control such that the air-fuel ratio becomes a richer air-fuel ratio during a first period from a beginning of the catalyst temperature-increasing control to a specified air-fuel ratio switching timing than during a second period from the air-fuel ratio switching timing to a completion of the catalyst temperature-increasing control.

7 Claims, 4 Drawing Sheets

(56) References Cited

U.S. PATENT DOCUMENTS

| | | | |
|---|---|---|---|
| 2001/0018825 A1* | 9/2001 | Kuji | F02D 41/402 |
| | | | 60/286 |
| 2004/0187480 A1* | 9/2004 | Bidner | F01N 3/0842 |
| | | | 60/285 |
| 2014/0041362 A1 | 2/2014 | Ulrey et al. | |
| 2018/0202336 A1* | 7/2018 | Kaneko | F01N 3/0864 |

* cited by examiner

CONTROLLER AND CONTROL METHOD FOR INTERNAL COMBUSTION ENGINE

BACKGROUND

1. Field

The following description relates to a controller and a control method for an internal combustion engine applied to a spark-ignition internal combustion engine in which a three-way catalyst device is arranged in an exhaust passage.

2. Description of Related Art

A spark-ignition internal combustion engine performs combustion by igniting, with a spark of an ignition plug, the mixture of air and fuel introduced into a cylinder. The combustion of some of the fuel in the air-fuel mixture may be incomplete, thereby generating carbonaceous particulate matter (hereinafter referred to as PM).

U.S. Patent Application Publication No. 2014/0041362 discloses an onboard spark-ignition internal combustion engine including a three-way catalyst device arranged in an exhaust passage and a PM-capturing filter arranged at the downstream side of the three-way catalyst device in the exhaust passage. In such an internal combustion engine, PM generated in the cylinder is captured by a filter to restrict the PM from being released to the outside. The captured PM gradually deposits in the filter. Thus, if the deposition is left, the deposited PM may eventually clog the filter.

In the internal combustion engine, the PM deposited in the filter is removed in the following manner. That is, in the internal combustion engine, while the vehicle is coasting, fuel injection is performed with the spark of the ignition plug stopped, thereby introducing unburned air-fuel mixture into the three-way catalyst device. When the unburned air-fuel mixture is introduced, the air-fuel mixture burns in the three-way catalyst device, thereby increasing the temperature of the three-way catalyst device (hereinafter referred to as catalyst temperature). Such an increase in the catalyst temperature increases the temperature of gas flowing out of the three-way catalyst device into the filter. When the heat of the high-temperature gas increases the temperature of the filter to be higher than or equal to the ignition point of the PM, the PM deposited in the filter is burned and removed.

During the execution of the catalyst temperature-increasing control, when the fuel concentration of the air-fuel mixture introduced into the three-way catalyst device is excessively high, the catalyst temperature increases excessively. In contrast, when the fuel concentration of the air-fuel mixture during the catalyst temperature-increasing control is reduced to limit an excessive increase in the catalyst temperature, the catalyst temperature increases slowly. As a result, it takes time to complete the catalyst temperature-increasing control.

The catalyst temperature-increasing control may be executed for purposes other than burning and removal of the PM deposited in the filter. For example, in a case in which the exhaust purification performance of the three-way catalyst device is reduced due to a decrease in the catalyst temperature during fuel cut-off of the internal combustion engine when the vehicle is decelerating, the catalyst temperature-increasing control may be executed to restore the exhaust purification performance of the three-way catalyst device. In such a case, the above-described problem occurs in the same manner. Thus, regardless of purposes, the above-described problem is common when the catalyst temperature-increasing control is performed by introducing unburned air-fuel mixture into the three-way catalyst device.

SUMMARY

A first aspect provides a controller configured to control an internal combustion engine. The internal combustion engine includes a fuel injection valve, a cylinder into which air-fuel mixture containing fuel injected by the fuel injection valve is introduced, an ignition device that ignites the air-fuel mixture introduced into the cylinder with a spark, an exhaust passage through which gas discharged out of the cylinder flows, and a three-way catalyst device arranged in the exhaust passage. The controller is configured to execute a catalyst temperature-increasing control of increasing a temperature of the three-way catalyst device by introducing air-fuel mixture, which contains the fuel injected by a fuel injection valve, into an exhaust passage without burning the air-fuel mixture in a cylinder. The controller includes an air-fuel ratio control unit configured to control an air-fuel ratio of the air-fuel mixture during the execution of the catalyst temperature-increasing control such that the air-fuel ratio becomes a richer air-fuel ratio during a first period from a beginning of the catalyst temperature-increasing control to a specified air-fuel ratio switching timing than during a second period from the air-fuel ratio switching timing to a completion of the catalyst temperature-increasing control.

In such a case, during the first period, rich air-fuel mixture is introduced into the three-way catalyst device, thereby increasing the catalyst temperature quickly. During the second period, which is subsequent to the first period, leaner air-fuel mixture than that during the first period is introduced into the three-way catalyst device, thereby limiting an increase in the catalyst temperature. This allows the temperature of the three-way catalyst device to increase quickly while limiting an excessive temperature increase.

The increase amount of the catalyst temperature after the catalyst temperature-increasing control starts is positively correlated with the amount of fuel that burns in the temperature-increasing control, that is, the integrated value of the fuel injection amount of the fuel injection valve after the catalyst temperature-increasing control starts. Thus, when the air-fuel ratio control unit of the controller for the internal combustion engine is configured to define, as the air-fuel ratio switching timing, a timing at which the integrated value of the fuel injection amount of the fuel injection valve after the catalyst temperature-increasing control starts, the switching timing of the air-fuel ratio can be set in accordance with the increase amount of the catalyst temperature after the catalyst temperature-increasing control starts.

In a case in which the switching determination value is a fixed value, if the catalyst temperature when the catalyst temperature-increasing control starts is low, the air-fuel ratio is switched before the catalyst temperature increases sufficiently. As a result, the temperature of the three-way catalyst device may increase insufficiently, thereby delaying completion of the temperature increase. Thus, the air-fuel ratio control unit should simply be configured to set the switching determination value to a larger value in a case in which the temperature of the three-way catalyst device is low when the catalyst temperature-increasing control starts than in a case in which the temperature is high when the catalyst temperature-increasing control starts.

The control of the air-fuel ratio by the air-fuel ratio control unit can be performed by, for example, controlling the fuel injection amount of the fuel injection valve.

In the internal combustion engine including the PM-capturing filter located at the downstream side of the temperature-increasing control in the exhaust passage, PM deposited in the filter can be burned and removed by increasing the catalyst temperature through the catalyst temperature-increasing control. That is, as the catalyst temperature increases, the temperature of gas flowing out of the three-way catalyst device into the filter increases. The heat of the high-temperature gas increases the temperature of the filter. When the temperature of the filter increases to be higher than or equal to the ignition point of the PM, the PM deposited in the filter is burned and removed. In some cases, in the internal combustion engine having such a filter, the catalyst temperature-increasing control is performed in order to burn and remove the PM deposited in the filter. In such a case, when the controller for the internal combustion engine is configured to estimate the PM deposit amount of the filter and execute the catalyst temperature-increasing control on the condition that the estimated PM deposit amount is greater than or equal to the specified value, the catalyst temperature-increasing control can be executed at a suitable timing in accordance with how the PM is deposited in the filter.

A second aspect provides a method for controlling an internal combustion engine. The internal combustion engine includes a fuel injection valve, a cylinder into which air-fuel mixture containing fuel injected by the fuel injection valve is introduced, an ignition device that ignites the air-fuel mixture introduced into the cylinder with a spark, an exhaust passage through which gas discharged out of the cylinder flows, and a three-way catalyst device arranged in the exhaust passage. The method includes executing a catalyst temperature-increasing control of increasing a temperature of the three-way catalyst device by introducing the air-fuel mixture, which contains the fuel injected by the fuel injection valve, into the exhaust passage without burning the air-fuel mixture in the cylinder and controlling an air-fuel ratio of the air-fuel mixture during the execution of the catalyst temperature-increasing control such that the air-fuel ratio becomes a richer air-fuel ratio during a first period from a beginning of the catalyst temperature-increasing control to a specified air-fuel ratio switching timing than during a second period from the air-fuel ratio switching timing to a completion of the catalyst temperature-increasing control.

A third aspect provides a controller configured to control an internal combustion engine. The internal combustion engine includes a fuel injection valve, a cylinder into which air-fuel mixture containing fuel injected by the fuel injection valve is introduced, an ignition device that ignites the air-fuel mixture introduced into the cylinder with a spark, an exhaust passage through which gas discharged out of the cylinder flows, and a three-way catalyst device arranged in the exhaust passage. The controller includes processing circuitry. The processing circuitry is configured to execute a catalyst temperature-increasing control of increasing a temperature of the three-way catalyst device by introducing the air-fuel mixture, which contains the fuel injected by the fuel injection valve, into the exhaust passage without burning the air-fuel mixture in the cylinder. The processing circuitry is configured to control an air-fuel ratio of the air-fuel mixture during the execution of the catalyst temperature-increasing control such that the air-fuel ratio becomes a richer air-fuel ratio during a first period from a beginning of the catalyst temperature-increasing control to a specified air-fuel ratio switching timing than during a second period from the air-fuel ratio switching timing to a completion of the catalyst temperature-increasing control Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller for an internal combustion engine according to an embodiment will now be described in detail with reference to FIGS. 1 to 6.

Figure 1:
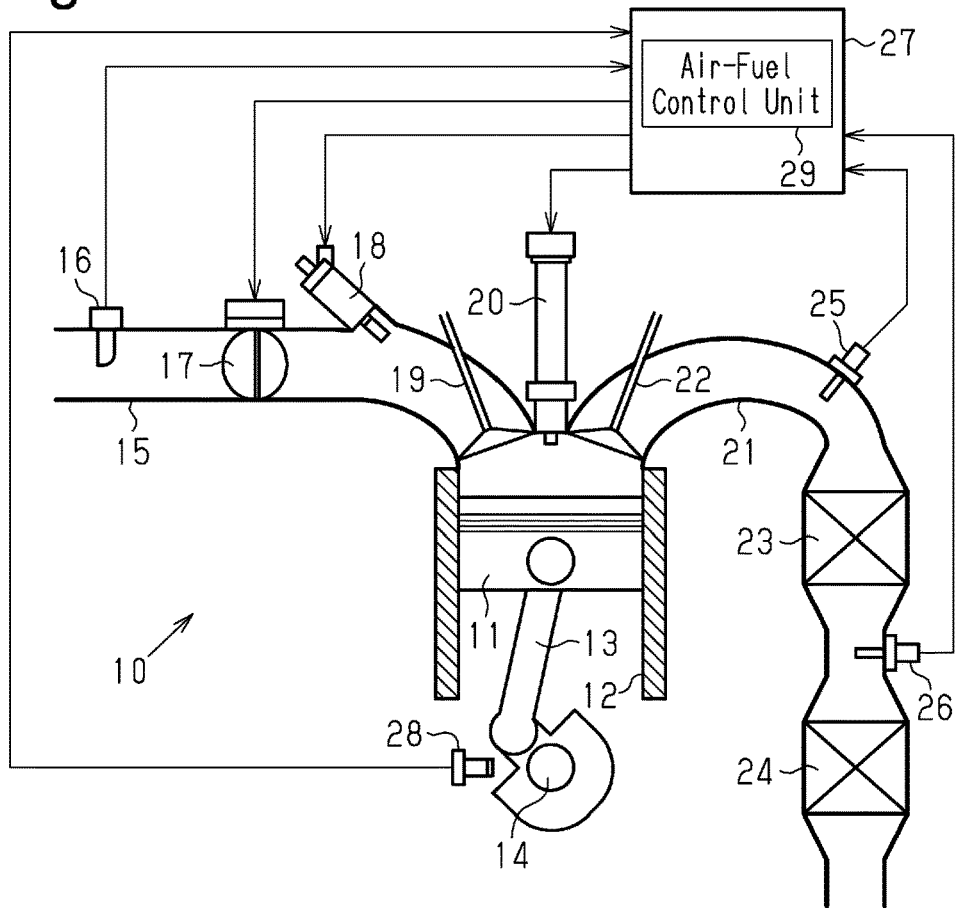
FIG. 1 is a schematic diagram showing the configuration of a controller for an internal combustion engine according to an embodiment.

FIG. 1 shows an internal combustion engine 10, to which the controller of the present embodiment is applied. The internal combustion engine 10 includes a cylinder 12, which accommodates a piston 11 such that the piston 11 can reciprocate. The piston 11 is coupled to a crankshaft 14 via a connecting rod 13. The reciprocating motion of the piston 11 in the cylinder 12 is converted into rotation of the crankshaft 14.

The cylinder 12 is connected to an intake passage 15, through which air is introduced. The intake passage 15 is provided with an airflow meter 16, which detects the flow rate of the air flowing through the intake passage 15 (intake air amount). A throttle valve 17 is provided in the intake passage 15 at the downstream side of the airflow meter 16. In the internal combustion engine 10, the intake air amount is adjusted by controlling the open degree of the throttle valve 17. Further, a fuel injection valve 18 is provided in the intake passage 15 at the downstream side of the throttle valve 17. The fuel injection valve 18 injects fuel into the air flowing through the intake passage 15 to form mixture of air and fuel.

The cylinder 12 has an intake valve 19, which connects and disconnects the intake passage 15 to and from the cylinder 12. Air-fuel mixture is introduced from the intake passage 15 to the cylinder 12 when the intake valve 19 opens. The cylinder 12 is provided with an ignition device 20, which ignites and burns the air-fuel mixture in the cylinder 12 with a spark.

The cylinder 12 is connected to an exhaust passage 21, which discharges exhaust gas generated by combustion of air-fuel mixture. The cylinder 12 has an exhaust valve 22, which connects and disconnects the exhaust passage 21 to and from the cylinder 12. The exhaust gas is introduced from the cylinder 12 into the exhaust passage 21 when the exhaust valve 22 opens.

The exhaust passage 21 is provided with a three-way catalyst device 23, which oxidizes CO and HC in the exhaust gas and reduces NOx. Further, a filter 24 for trapping PM in exhaust gas is provided in the exhaust passage 21 at the downstream side of the three-way catalyst device 23. An air-fuel ratio sensor 25 is arranged at the upstream side of the three-way catalyst device 23 in the exhaust passage 21 to detect the oxygen concentration of the gas flowing through the exhaust passage 21, that is, the air-fuel ratio of the air-fuel mixture. Further, a catalyst outflow gas temperature sensor 26 is arranged between the three-way catalyst device 23 and the filter 24 in the exhaust passage 21 to detect the temperature of gas flowing out of the three-way catalyst device 23 (catalyst outflow gas temperature).

The engine 10 includes a controller 27. The controller 27 is configured as a microcomputer including a calculation processing circuit that executes calculation processes for control and a memory that stores programs and data for control. The controller 27 receives detection signals from the airflow meter 16, the air-fuel ratio sensor 25, and the catalyst outflow gas temperature sensor 26. Also, the controller 27 receives detection signals from a crank angle sensor 28, which detects the rotational angle of the crankshaft 14 (crank angle). The controller 27 also calculates the rotational speed (engine rotational speed) of the crankshaft 14 from the detection result of the crank angle. The controller 27 controls parameters such as the open degree of the ignition device 20, the amount and timing of the fuel injection of the fuel injection valve 18, and the execution timing of the spark of the ignition device 20 (ignition timing), thereby controlling the operating state of the internal combustion engine 10.

As described above, in the internal combustion engine 10, PM in exhaust gas is captured in the filter 24, which is located in the exhaust passage 21. As the PM deposits in the filter 24, the filter 24 clogs eventually.

The controller 27 estimates the amount of PM deposited in the filter 24 (PM deposition amount) based on the operation condition of the internal combustion engine 10 such as the intake air amount and the fuel injection amount. The controller 27 is configured to execute a catalyst temperature-increasing control of increasing the temperature of the three-way catalyst device 23 (hereinafter referred to as catalyst temperature) when the PM deposition amount becomes greater than or equal to a specified value.

The controller 27 is configured to execute a fuel introduction process of introducing air-fuel mixture containing fuel injected by the fuel injection valve 18 without burning the air-fuel mixture in the cylinder 12 during the execution of the catalyst temperature-increasing control. The fuel introduction process is performed by executing fuel injection of the fuel injection valve 18 with the spark of the ignition device 20 stopped. When the fuel introduction process is performed in such a manner to introduce unburned air-fuel mixture into the exhaust passage 21, the air-fuel mixture burns in the three-way catalyst device 23. This burning generates heat. As the heat increases the catalyst temperature, the temperature of gas flowing out of the three-way catalyst device 23 and then into the filter 24 increases. The flowing high-temperature gas heats the filter 24. Thus, when the filter 24 is heated to the temperature of the ignition point of the PM or higher, the PM deposited in the filter 24 can be burned and removed. Accordingly, the controller 27 burns and removes the PM deposited in the filter 24 by executing the catalyst temperature-increasing control to increase the temperature of the three-way catalyst device 23 to a target temperature, which is set as a catalyst temperature at which the filter 24 can be heated to the temperature of the ignition point of the PM or higher.

In the fuel introduction process of the catalyst temperature-increasing control, the air-fuel mixture in the cylinder 12 needs to be delivered to the exhaust passage 21 through a pump action caused by moving the piston 11 upwards and downwards with the combustion operation of the internal combustion engine 10 stopped. Thus, the catalyst temperature-increasing control needs to be performed in a situation in which rotation of the crankshaft 14 can be maintained by external driving force. In a case in which the internal combustion engine 10 is mounted on the vehicle, while the vehicle is coasting, rotation of the crankshaft 14 can be maintained by transmission of the driving force from the wheels even if the combustion operation of the internal combustion engine 10 is stopped. Thus, the catalyst temperature-increasing control can be executed while, for example, the vehicle is coasting. Further, some hybrid vehicles having a motor as a drive source in addition to the internal combustion engine 10 are capable of rotating the crankshaft 14 using the driving force of the motor with the combustion operation of the internal combustion engine 10 stopped. In such hybrid vehicles, the fuel introduction process can be performed while rotating the crankshaft 14 with the driving force of the motor.

The controller 27 includes an air-fuel ratio control unit 29, which controls the air-fuel ratio of air-fuel mixture introduced into the exhaust passage 21 in the fuel introduction process during the catalyst temperature-increasing control. The air-fuel ratio control unit 29 controls the air-fuel ratio of the air-fuel mixture by controlling the fuel injection amount of the fuel injection valve 18 in accordance with the intake air amount detected by the airflow meter 16. The air-fuel ratio control unit 29 controls the air-fuel ratio of the air-fuel mixture during the execution of the catalyst temperature-increasing control such that the air-fuel ratio becomes a richer air-fuel ratio during a first period from the beginning of the catalyst temperature-increasing control to a specified air-fuel ratio switching timing than during a second period from the air-fuel ratio switching timing to the completion of the catalyst temperature-increasing control.

The air-fuel ratio control unit 29 performs the air-fuel ratio control during the execution of the catalyst temperature-increasing control such that the air-fuel ratio of the air-fuel mixture in the first period is set to a limit air-fuel ratio LMT (described later) and the air-fuel ratio of the air-fuel mixture in the second period is set to a convergent air-fuel ratio CON (described later).

Figure 2:
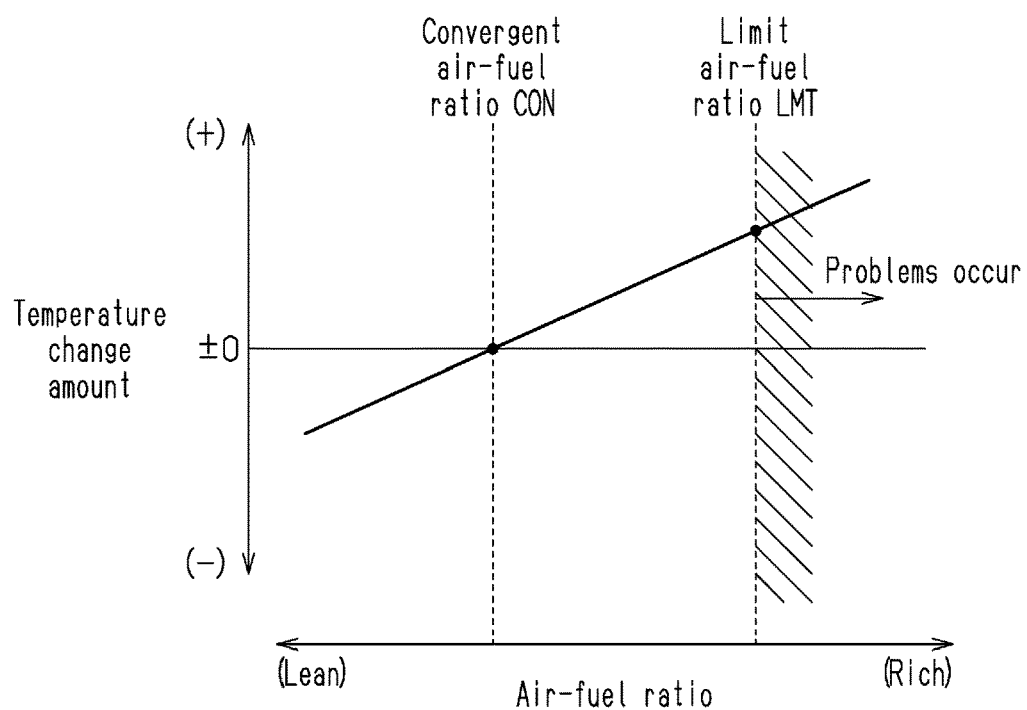
FIG. 2 is a graph showing the relationship between an air-fuel ratio and a temperature change amount.

FIG. 2 shows the relationship between the air-fuel ratio of air-fuel mixture flowing into the three-way catalyst device 23 and the change amount of the catalyst temperature when the fuel introduction process is executed for a certain period of time after the catalyst temperature reaches the target temperature, with the temperature and the flow rate of the air-fuel mixture fixed. The heat receiving amount of the three-way catalyst device 23 during the catalyst temperature-increasing control is the difference obtained by subtracting, from the amount of heat generated through the combustion of air-fuel mixture in the three-way catalyst device 23, the amount of heat taken away by gas flowing out of the three-way catalyst device 23. When this difference is a positive value, the catalyst temperature increases from the target temperature in the certain period. When the difference is a negative value, the catalyst temperature decreases from the target temperature in the certain period. When the difference is zero, the catalyst temperature remains at the target temperature. The convergent air-fuel ratio CON is an air-fuel ratio of air-fuel mixture in which this catalyst temperature remains at the target temperature.

In the range of an air-fuel ratio leaner than a stoichiometric air-fuel ratio, in which the amount of oxygen that can burn all of the fuel contained in air-fuel mixture exists in the air-fuel mixture, as the fuel concentration of air-fuel mixture increases, the amount of heat generated through combustion of the air-fuel mixture in the three-way catalyst device 23 increases and the temperature of the outflow gas increases, thereby reducing the amount of heat to be taken away. Thus, in this range, as the fuel concentration of air-fuel mixture is increased, the temperature of the three-way catalyst device 23 can be increased quickly during the catalyst temperature-increasing control. However, when the fuel concentration of the air-fuel mixture is higher than a certain fuel concentration, problems occur such as the occurrence of afterfire, in which the air-fuel mixture burns in the exhaust passage 21 before flowing into the three-way catalyst device 23, and emission of the fuel that remains unburned in the three-way catalyst device 23 to the air. Thus, there is a limit to enrichment of the air-fuel ratio of the air-fuel mixture during the catalyst temperature-increasing control. The limit air-fuel ratio LMT is an air-fuel ratio serving as the limit of such enrichment.

Figure 3:
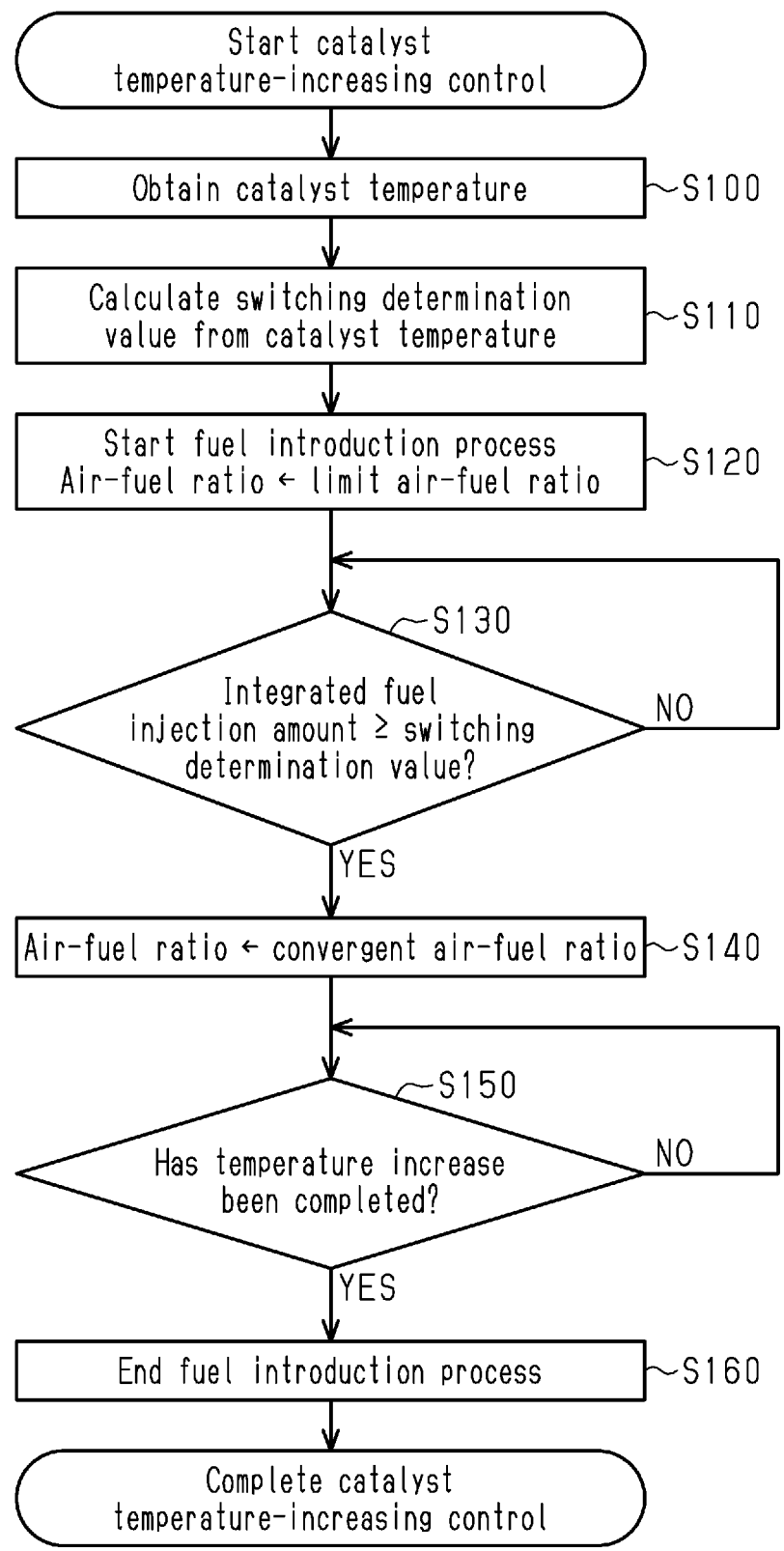
FIG. 3 is a flowchart showing a procedure of a catalyst temperature-increasing control executed by the controller.

FIG. 3 shows a procedure executed by the controller 27 from the beginning to the end of the catalyst temperature-increasing control. In a case in which the combustion operation of the internal combustion engine 10 is resumed in the middle of the catalyst temperature-increasing control, the process of the catalyst temperature-increasing control is forcibly ended at the point in time the operation is resumed. When subsequently executing the catalyst temperature-increasing control again, the controller 27 executes a series of processes shown in FIG. 3 from the beginning.

When the catalyst temperature-increasing control starts, the current catalyst temperature (i.e., the catalyst temperature when the catalyst temperature-increasing control starts, which is hereinafter referred to as starting temperature) is first obtained in step S100. The catalyst temperature is estimated and obtained from the operation condition of the internal combustion engine 10 and the detection result of the catalyst outflow gas temperature sensor 26. Then, in step S110, a switching determination value is set based on the starting temperature.

Figure 4:
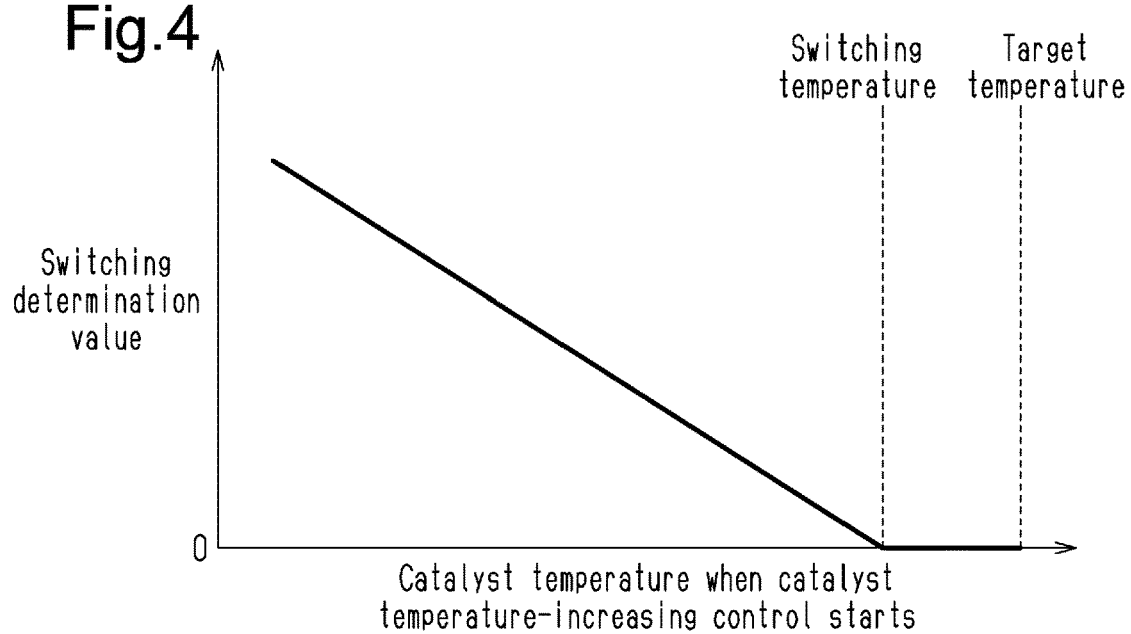
FIG. 4 is a graph showing the relationship between a switching determination value set by the controller in the catalyst temperature-increasing control and a catalyst temperature when the catalyst temperature-increasing control starts.

FIG. 4 shows the relationship between the starting temperature and the switching determination value. In the fuel introduction process, the integrated value of the fuel injection amount necessary to increase the catalyst temperature from the starting temperature to a specified switching temperature is set as the switching determination value. The switching temperature is slightly lower than the target temperature. As the starting temperature decreases, the difference between the switching temperature and the starting temperature increases, thereby increasing an integrated fuel injection amount necessary to increase the catalyst temperature from the starting temperature to the switching temperature. Thus, as shown in FIG. 4, the switching determination value is set to a larger value when the starting temperature is low than when the starting temperature is high. When the starting temperature is greater than or equal to the switching determination value, the switching determination value is set to 0.

Subsequently, in step S120, the fuel introduction process is started with the air-fuel ratio of the air-fuel mixture controlled to the limit air-fuel ratio LMT by the air-fuel ratio control unit 29. The fuel introduction process with the air-fuel ratio of the air-fuel mixture controlled to the limit air-fuel ratio LMT continues until the integrated fuel injection amount becomes greater than or equal to the switching determination value (S130: YES).

When the integrated fuel injection amount becomes greater than or equal to the switching determination value (S130: YES), the air-fuel ratio of the air-fuel mixture introduced into the exhaust passage 21 in the fuel introduction process is switched by the air-fuel ratio control unit 29 from the limit air-fuel ratio LMT to the convergent air-fuel ratio CON in step S140. Then, the fuel introduction process with the air-fuel ratio of the air-fuel mixture set to the convergent air-fuel ratio CON continues until it is determined that the catalyst temperature reaches the target temperature and the temperature increase in the three-way catalyst device 23 ends (S150: YES). In the present embodiment, the determination that the temperature increase ends is made based on the estimated result of the catalyst temperature. That is, a timing at which the estimated value of the catalyst temperature becomes greater than or equal to the target temperature is defined as a timing at which the temperature increase in the three-way catalyst device 23 ends. When it is determined that the temperature increase in the three-way catalyst device 23 ends, the fuel introduction process ends in step S160, thereby completing the current catalyst temperature-increasing control.

When the starting temperature is greater than or equal to the switching temperature and the switching determination value is set to 0, the fuel introduction process in which the air-fuel ratio is controlled to the limit air-fuel ratio LMT (S120) is not performed. Instead, the fuel introduction process in which the air-fuel ratio is controlled to the convergent air-fuel ratio CON (S140) is performed from the beginning of the catalyst temperature-increasing control.

At the point in time the catalyst temperature-increasing control is completed, in a case in which the combustion of the internal combustion engine 10 can remain stopped, the controller 27 starts a catalyst temperature-keeping control to keep the catalyst temperature at the target temperature in addition to the catalyst temperature-increasing control. The catalyst temperature-keeping control is performed by executing the fuel introduction process with the air-fuel ratio of unburned air-fuel mixture introduced into the exhaust passage 21 controlled to the convergent air-fuel ratio CON. The catalyst temperature-keeping control continues until the combustion operation of the internal combustion engine 10 is resumed or until the burning and removal of the PM deposited in the filter 24 is completed.

The operation and advantages of the present embodiment will now be described.

Figure 5:
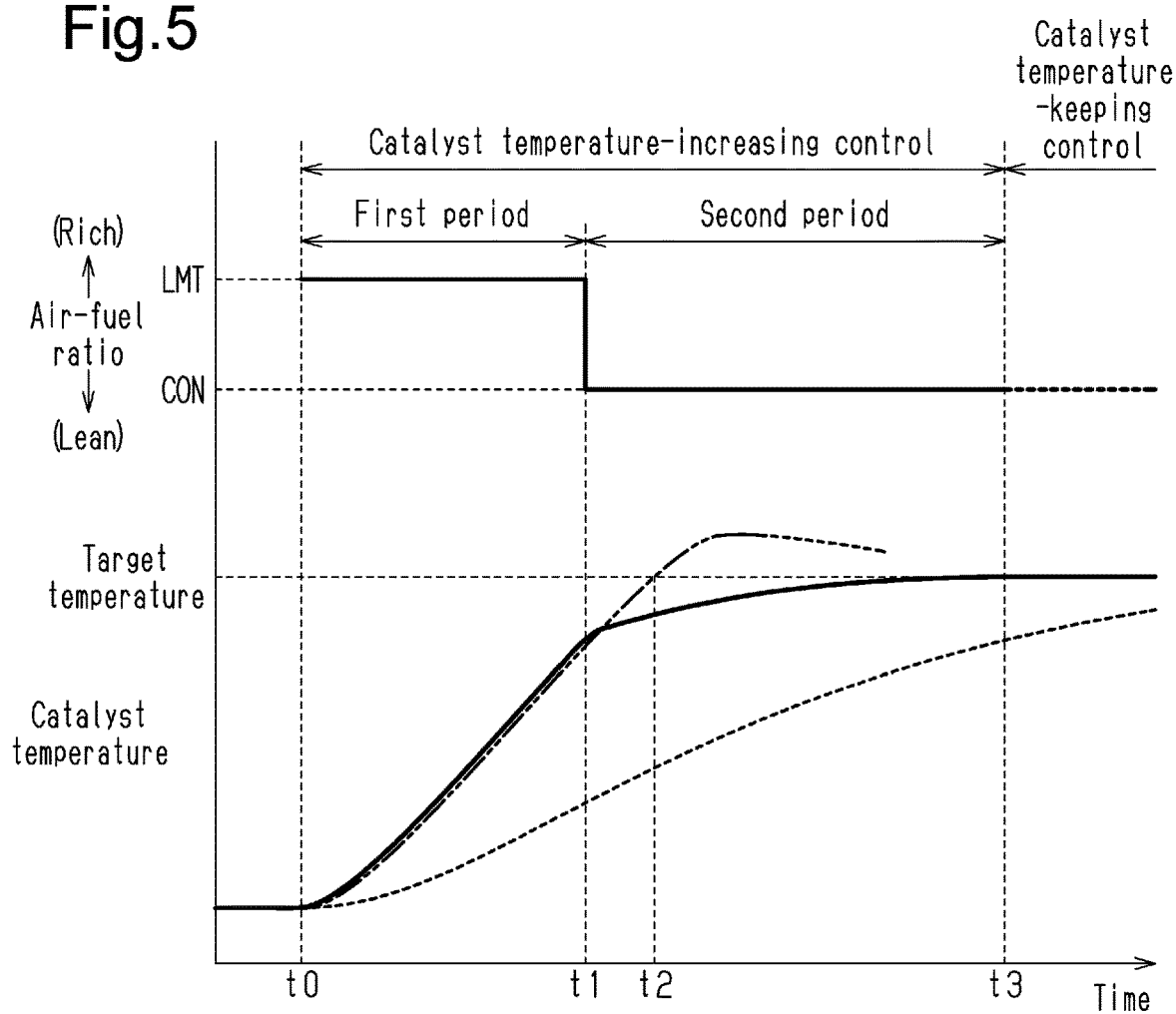
FIG. 5 is a time chart showing an example of how the controller performs the catalyst temperature-increasing control.

In FIG. 5, the long dashed double-short dashed line shows changes in the catalyst temperature that occur when the catalyst temperature-increasing control is started at time t0 and then the fuel introduction process is executed with the air-fuel ratio set to the limit air-fuel ratio LMT until completion of the control. In this case, the fuel introduction process is performed with the air-fuel ratio enriched to the limit such that afterfire or emission of fuel to the outside can be avoided. Thus, the catalyst temperature increases quickly. At time t2, in which the catalyst temperature reaches the target temperature, the fuel introduction process is ended to complete the catalyst temperature-increasing control. However, even when the fuel introduction process is ended, the combustion of the air-fuel mixture in the three-way catalyst device 23 does not stop immediately. Thus, the catalyst temperature continues to increase for a while after time t2. Accordingly, in such a case, although the catalyst temperature increases quickly, the catalyst temperature may exceed the target temperature and increase excessively.

In FIG. 5, the dotted line shows changes in the catalyst temperature that occur when the catalyst temperature-increasing control is started at time t0 and then the fuel introduction process is executed with the air-fuel ratio set to the convergent air-fuel ratio CON until completion of the control. When the air-fuel ratio is set to the convergent air-fuel ratio CON, the catalyst temperature stops increasing at the point in time the catalyst temperature reaches the target temperature. Then, the catalyst temperature remains at the the target temperature. This prevents situations in which the catalyst temperature exceeds the target temperature and increases excessively. Nevertheless, in this case, the catalyst temperature increases more slowly than when the air-fuel ratio of the air-fuel mixture is set to the limit air-fuel ratio LMT. This prolongs the time to complete the catalyst temperature-increasing control.

In the present embodiment, after the catalyst temperature-increasing control is started at time to, the integrated fuel injection amount from the beginning of the catalyst temperature-increasing control reaches the switching determination value at time t1. During the first period from time t0 to time t1, the fuel introduction process is performed with the air-fuel ratio set to the limit air-fuel ratio LMT. In the second period from time t1 to time t3, at which the catalyst temperature reaches the target temperature to complete the catalyst temperature-increasing control, the fuel introduction process is performed with the air-fuel ratio set to the convergent air-fuel ratio CON. In such a case, the catalyst temperature increases quickly during the first period. During the second period after time t1, at which the catalyst temperature increases to a certain temperature (switching temperature), the catalyst temperature increases gently such that the catalyst temperature does not exceed the target temperature. This allows the temperature of the three-way catalyst device 23 to increase quickly while limiting an excessive temperature increase.

Figure 6:
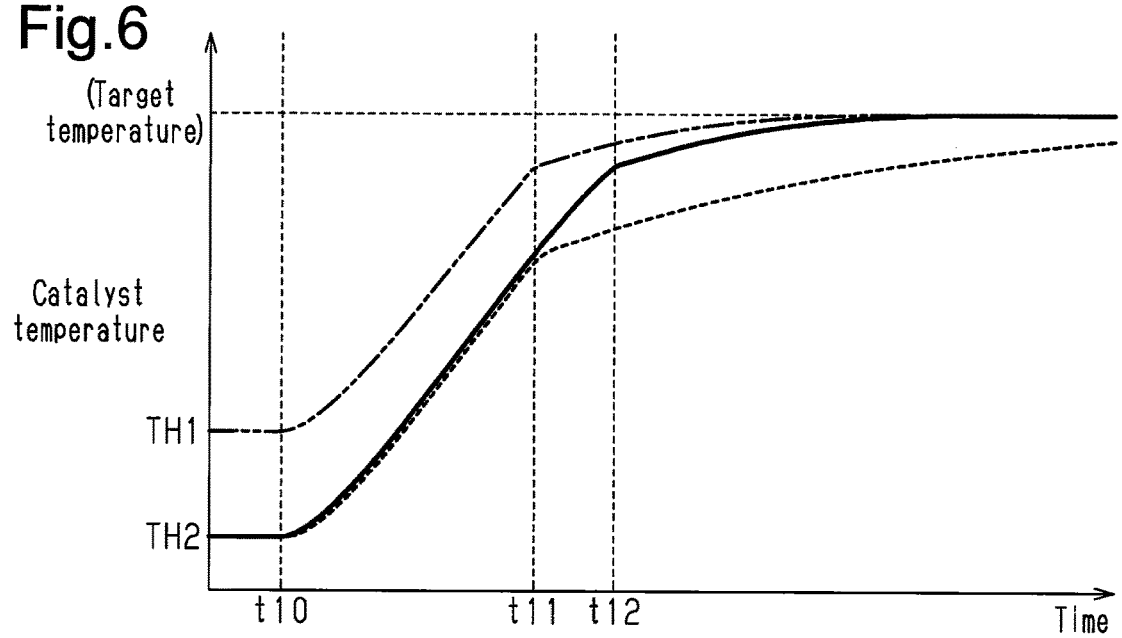
FIG. 6 is a time chart showing changes in the catalyst temperature during the catalyst temperature-increasing control.

In FIG. 6, the long dashed double-short dashed line shows changes in the catalyst temperature during the catalyst temperature-increasing control that occur in a case in which the catalyst temperature (starting temperature) when the catalyst temperature-increasing control starts (t10) is a temperature TH1 (hereinafter referred to as high-temperature start case) in the controller for the internal combustion engine of the present embodiment. In FIG. 6, the solid line shows changes in the catalyst temperature during the catalyst temperature-increasing control that occur in a case in which the starting temperature is a temperature TH2, which is lower than the temperature TH1 (hereinafter referred to as low-temperature start case), in the controller for the internal combustion engine of the present embodiment. In the present embodiment, the switching determination value is set to a larger value when the starting temperature is low than when the starting temperature is high. Thus, in the low-temperature start case, the switching of the air-fuel ratio during the catalyst temperature-increasing control is performed at time t12, which is later than the high-temperature start case (t11).

In FIG. 6, the dotted line shows changes in the catalyst temperature during the catalyst temperature-increasing control in the low-temperature start case when the switching determination value is a fixed value. When the switching determination value is the fixed value, the air-fuel ratio is switched in the low-temperature start case at time t11 in the same manner as the high low-temperature start case. The catalyst temperature increases more slowly during the second period, which is subsequent to the switching of the air-fuel ratio, than during the first period, which is prior to the switching of the air-fuel ratio. Thus, in such a case, when the starting temperature is low, the air-fuel ratio is switched before the catalyst temperature increases sufficiently. This delays completion of the catalyst temperature-increasing control.

In the present embodiment, since the switching determination value is changed in accordance with the starting temperature, the catalyst temperature when the air-fuel ratio is switched is not greatly changed by the starting temperature. This prevents the completion of the catalyst temperature-increasing control from being greatly delayed when the starting temperature is low.

The present embodiment may be modified as follows. The present embodiment and the following modifications can be combined as long as the combined modifications remain technically consistent with each other.

Figure 7:
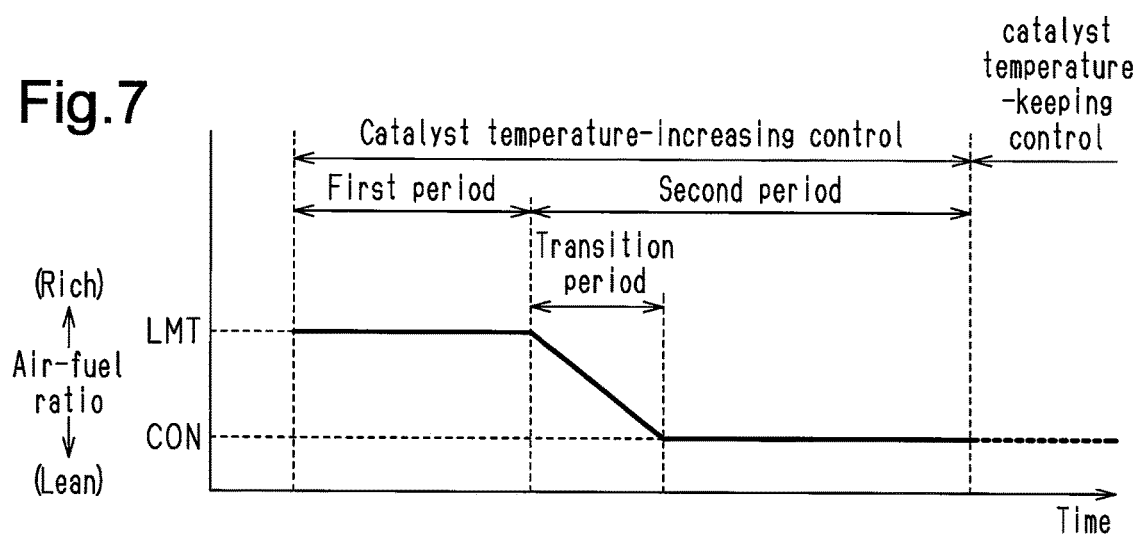
FIG. 7 is a time chart showing a modification of how the catalyst temperature-increasing control is performed.
Figure 8:
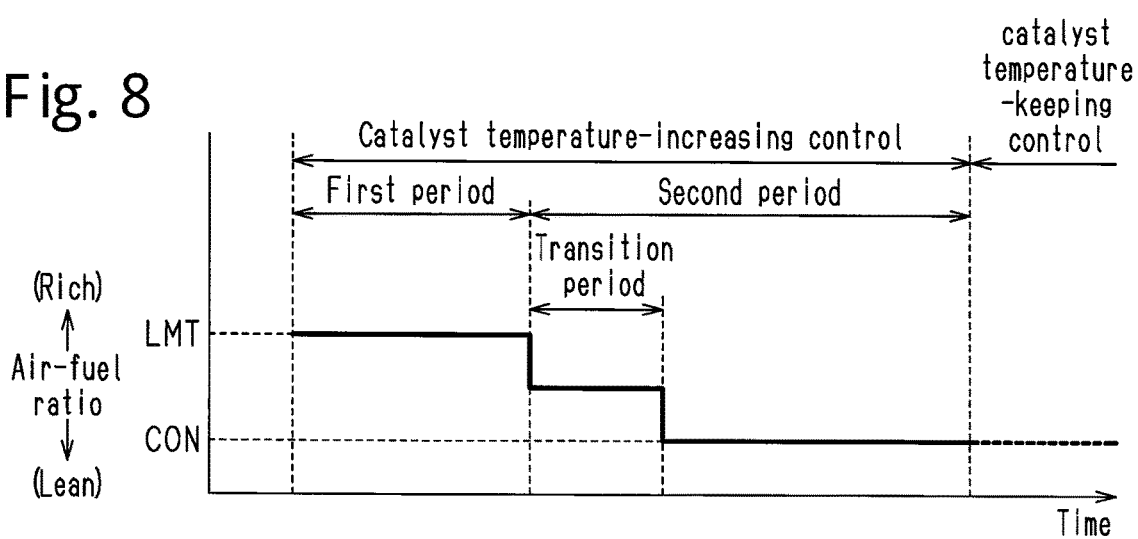
FIG. 8 is a time chart showing another modification of how the catalyst temperature-increasing control is performed.

In the above-described embodiment, the air-fuel ratio of unburned air-fuel mixture introduced into the exhaust passage 21 is immediately switched from the limit air-fuel ratio LMT to the convergent air-fuel ratio CON at the point in time the integrated fuel injection amount becomes greater than or equal to the switching determination value. Instead, a certain period after the second period starts may be a transition period in which the air-fuel ratio of the air-fuel mixture is leaner than the limit air-fuel ratio LMT and richer than the convergent air-fuel ratio CON. FIG. 7 shows how the air-fuel ratio is controlled during the catalyst temperature-increasing control when the air-fuel ratio is gradually changed from the limit air-fuel ratio LMT to the convergent air-fuel ratio CON during such a transition period. FIG. 8 shows how the the air-fuel ratio is controlled during the catalyst temperature-increasing control when the air-fuel ratio remains leaner than the limit air-fuel ratio LMT and richer than the convergent air-fuel ratio CON during the transition period.

In the above-described embodiment, the timing of switching the air-fuel ratio of unburned air-fuel mixture introduced into the exhaust passage 21 from the limit air-fuel ratio LMT to the convergent air-fuel ratio CON (air-fuel ratio switching timing) is determined based on the integrated fuel injection amount from the beginning of the catalyst temperature-increasing control. However, the air-fuel ratio switching timing does not have to be determined in this manner. The air-fuel ratio switching timing may be determined based on, for example, the catalyst temperature or the time elapsed after the catalyst temperature-increasing control starts.

In the above-described embodiment, the air-fuel ratio control unit 29 controls the air-fuel ratio of unburned air-fuel mixture introduced into the exhaust passage 21 during the catalyst temperature-increasing control such that the air-fuel ratio during the first period is set to the limit air-fuel ratio LMT, which is the limit of enrichment, and the air-fuel ratio during the second period is set to the convergent air-fuel ratio CON, in which the catalyst temperature converges to the target temperature. Instead, as long as the air-fuel ratio of the first period is richer than the air-fuel ratio of the second period, the air-fuel ratio of the first period and the air-fuel ratio of the second period may be respectively set to values other than the limit air-fuel ratio LMT and the convergent air-fuel ratio CON.

In the above-described embodiment, the air-fuel ratio control unit 29 controls the air-fuel ratio of unburned air-fuel mixture introduced into the exhaust passage 21 during the catalyst temperature-increasing control by controlling the fuel injection amount of the fuel injection valve 18. Instead, the air-fuel ratio may be controlled by, for example, controlling the open degree of the throttle valve 17.

In the above-described embodiment, unburned air-fuel mixture is introduced into the exhaust passage 21 by performing fuel injection with the spark of the ignition device 20 stopped. The timing at which the spark of the ignition device 20 can ignite the air-fuel mixture in the cylinder 12 is limited to a period close to the compression top dead center. That is, there is a period in which air-fuel mixture does not burn in the cylinder 12 even if the spark is generated. Thus, the fuel introduction of introducing unburned air-fuel mixture into the exhaust passage 21 can also be executed by performing fuel injection while generating the spark of the ignition device 20 during such a period.

In the above-described embodiment, the catalyst temperature-increasing control is performed in order to burn and remove the PM deposited in the filter 24. However, the catalyst temperature-increasing control in the above-described embodiment may be employed for other purposes even when the temperature of the three-way catalyst device 23 is increased. For example, the catalyst temperature-increasing control may be performed for the purpose of restoring the exhaust purification performance of the three-way catalyst device 23 when the exhaust purification performance is reduced due to a decrease in the catalyst temperature.

In the above-described embodiment, the catalyst temperature-keeping control is performed after completion of the catalyst temperature-increasing control such that the catalyst temperature remains at the target temperature. However, as long as the catalyst temperature does not need to remain at the target temperature after the catalyst temperature increases to the target temperature, the catalyst temperature-increasing control does not have to be executed after the completion of the catalyst temperature-increasing control.

In the above-described embodiment, the fuel introduction process is executed by injecting fuel into the intake passage 15 using the fuel injection valve 18. Alternatively, the fuel introduction process can be executed through fuel injection into the cylinders 12 in an internal combustion engine equipped with fuel injection valves of a direct injection type, which injects fuel into the cylinders 12.

The controller 27 is not limited to a device that includes a CPU and a memory and executes software processing. For example, at least part of the processes executed by the software in the above-described embodiment may be executed by hardware circuits dedicated to execution of these processes (such as ASIC). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller configured to control an internal combustion engine, the internal combustion engine including:
    a fuel injection valve;
    a cylinder into which air-fuel mixture containing fuel injected by the fuel injection valve is introduced;
    an ignition device that ignites the air-fuel mixture introduced into the cylinder with a spark;
    an exhaust passage through which gas discharged out of the cylinder flows; and
    a three-way catalyst device arranged in the exhaust passage, wherein
    the controller is configured to execute a catalyst temperature-increasing control of increasing a temperature of the three-way catalyst device by introducing the air-fuel mixture, which contains the fuel injected by the fuel injection valve, into the exhaust passage without burning the air-fuel mixture in the cylinder, and
    the controller comprises an air-fuel ratio control unit configured to control an air-fuel ratio of the air-fuel mixture during the execution of the catalyst temperature-increasing control such that the air-fuel ratio becomes a richer air-fuel ratio during a first period from a beginning of the catalyst temperature-increasing control to a specified air-fuel ratio switching timing than during a second period from the air-fuel ratio switching timing to a completion of the catalyst temperature-increasing control.

2. The controller according to claim 1, wherein the air-fuel ratio control unit is configured to define, as the air-fuel ratio switching timing, a timing at which an integrated value of a fuel injection amount of the fuel injection valve after starting the catalyst temperature-increasing control becomes greater than or equal to a specified switching determination value.

3. The controller according to claim 2, wherein the air-fuel ratio control unit is configured to set the switching determination to a larger value in a case in which the temperature of the three-way catalyst device is low when the catalyst temperature-increasing control starts than in a case in which the temperature is high.

4. The controller according to claim 1, wherein the air-fuel ratio control unit is configured to control the air-fuel ratio by controlling a fuel injection amount of the fuel injection valve.

5. The controller according to claim 1, wherein
the internal combustion engine includes a filter for capturing PM, the filter being located downstream of the three-way catalyst device in the exhaust passage, and
the controller is configured to estimate a PM deposition amount of the filter and execute the catalyst temperature-increasing control on the condition that the estimated PM deposition amount is greater than or equal to a specified value.

6. A method for controlling an internal combustion engine, the internal combustion engine including:
a fuel injection valve;
a cylinder into which air-fuel mixture containing fuel injected by the fuel injection valve is introduced;
an ignition device that ignites the air-fuel mixture introduced into the cylinder with a spark;
an exhaust passage through which gas discharged out of the cylinder flows; and
a three-way catalyst device arranged in the exhaust passage, wherein
the method comprises:
executing a catalyst temperature-increasing control of increasing a temperature of the three-way catalyst device by introducing the air-fuel mixture, which contains the fuel injected by the fuel injection valve, into the exhaust passage without burning the air-fuel mixture in the cylinder; and
controlling an air-fuel ratio of the air-fuel mixture during the execution of the catalyst temperature-increasing control such that the air-fuel ratio becomes a richer air-fuel ratio during a first period from a beginning of the catalyst temperature-increasing control to a specified air-fuel ratio switching timing than during a second period from the air-fuel ratio switching timing to a completion of the catalyst temperature-increasing control.

7. A controller configured to control an internal combustion engine, the internal combustion engine including:
a fuel injection valve;
a cylinder into which air-fuel mixture containing fuel injected by the fuel injection valve is introduced;
an ignition device that ignites the air-fuel mixture introduced into the cylinder with a spark;
an exhaust passage through which gas discharged out of the cylinder flows; and
a three-way catalyst device arranged in the exhaust passage, wherein
the controller comprises processing circuitry configured to:
execute a catalyst temperature-increasing control of increasing a temperature of the three-way catalyst device by introducing the air-fuel mixture, which contains the fuel injected by the fuel injection valve, into the exhaust passage without burning the air-fuel mixture in the cylinder; and
control an air-fuel ratio of the air-fuel mixture during the execution of the catalyst temperature-increasing control such that the air-fuel ratio becomes a richer air-fuel ratio during a first period from a beginning of the catalyst temperature-increasing control to a specified air-fuel ratio switching timing than during a second period from the air-fuel ratio switching timing to a completion of the catalyst temperature-increasing control.

* * * * *